(12) United States Patent
Enomoto et al.

(10) Patent No.: US 7,195,459 B2
(45) Date of Patent: Mar. 27, 2007

(54) FRANCIS TURBINE

(75) Inventors: Yasuyuki Enomoto, Chiba-ken (JP); Toshiaki Suzuki, Kanagawa-ken (JP); Sadao Kurosawa, Kanagawa-ken (JP); Takanori Nakamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 10/914,639

(22) Filed: Aug. 10, 2004

(65) Prior Publication Data
US 2005/0089404 A1 Apr. 28, 2005

(30) Foreign Application Priority Data
Aug. 11, 2003 (JP) .............................. 2003-291266

(51) Int. Cl.
*F03B 3/02* (2006.01)
(52) U.S. Cl. ................................ 416/185; 416/DIG. 2
(58) Field of Classification Search ................ 416/185, 416/186 R, 188, DIG. 2
See application file for complete search history.

(56) References Cited

U.S. PATENT DOCUMENTS

| 147,351 | A | | 2/1874 | Tyler | |
|---|---|---|---|---|---|
| 1,942,995 | A | * | 1/1934 | Biggs | .......................... 415/115 |
| 2,484,554 | A | | 10/1949 | Concordia et al. | |
| 3,639,080 | A | * | 2/1972 | Yamabe | .................. 416/186 R |
| 3,874,819 | A | * | 4/1975 | Tamura et al. | .......... 416/186 R |
| 3,918,627 | A | | 11/1975 | Kawano et al. | |
| 4,479,757 | A | | 10/1984 | Holmes et al. | |
| 6,135,716 | A | * | 10/2000 | Billdal et al. | ................ 416/183 |

FOREIGN PATENT DOCUMENTS

| JP | 8-312517 A | 11/1996 |
|---|---|---|
| JP | 2000-136766 A | 5/2000 |

OTHER PUBLICATIONS

U.S. Appl. No. 10/867,207 dated Nov. 28, 2005.
U.S. Appl. No. 10/867,207, filed Jun. 15, 2004, Enomoto et al.
U.S. Appl. No. 10/867,203, filed Jun. 15, 2004, Enomoto et al.
U.S. Appl. No. 10/867,203, dated Mar. 6, 2006.

* cited by examiner

*Primary Examiner*—Edward K. Look
*Assistant Examiner*—Devin Hanan
(74) *Attorney, Agent, or Firm*—Foley & Lardner LLP

(57) ABSTRACT

A Francis turbine with an improved shape of blades, which can reduce a circumferential velocity component generated in the flow downstream of the blades in a condition of a partial load operation, or reduce the secondary flow around the blades, is provided. A Francis turbine comprises a crown, a plurality of blades, and a band. The crown can rotate around a rotating axis. The blades are circumferentially arranged on the crown, each of which including an inner end as a trailing edge. The band is coaxially coupled with the crown by the blades. A distance Rc can be defined as a distance between the rotation axis and an end by the crown side of the trailing edge. A distance Rb can be defined as a distance between the rotation axis and an end by the band side of the trailing edge. The distance Rc and the distance Rb satisfy $$0.2 \leq \frac{R_c}{R_b} \leq 0.4.$$

2 Claims, 5 Drawing Sheets

FRANCIS TURBINE

CROSS REFERENCE TO RELATED APPLICATION

This application is based upon and claims the benefit of priority from prior Japanese Patent Application No. 2003-291266 filed on Aug. 11, 2003, the entire contents of which are incorporated herein by reference.

FIELD OF THE INVENTION

This invention relates to a Francis turbine that is used for a hydraulic turbine or a pump, and in particular, a Francis turbine having blades with an improved shape on a trailing edge.

BACKGROUND

A Francis turbine is used in a hydraulic machine, including a reversible pump-turbine, for power generation.

A conventional Francis turbine runner is described in U.S. Pat. No. 4,479,757. This conventional Francis turbine runner includes blades whose inlet (a leading edge) shape is curved toward a direction opposite to a rotating direction of a turbine operation from a band side to a crown side.

Another conventional Francis turbine runner is described in U.S. Pat. No. 6,135,716. This conventional Francis turbine runner includes blades whose inlet (a leading edge) shape is curved toward a rotating direction of a turbine operation from a band side to a crown side. This conventional Francis turbine runner also includes blades whose outlet (a trailing edge) shape is curved toward a rotating direction of a turbine operation from a crown side to a band side.

Also, a conventional reversible pump-turbine is described in Japanese Patent Publication (Kokai) No. 8-312517. A runner of this conventional reversible pump-turbine has blades whose trailing edge is curved toward a direction opposite to a rotation direction of turbine operation from a middle point of the trailing edge to a band side. Also, this conventional runner has a trailing edge, whose profile projected on a meridian plane (a plane including rotation axis) is elongated toward a downstream side at a band side to improve hydraulic efficiency in a condition of a partial load operation.

Another conventional reversible turbine is described in Japanese Patent Publication (Kokai) No. 2000-136766. A runner of this conventional reversible pump-turbine has blades whose trailing edge is curved so that the trailing edge is formed to be convex in a rotation direction of a turbine operation.

Those shapes of the blades of conventional Francis turbines are developed to improve a hydraulic efficiency or to reduce cavitations. Still there is room to develop the shape of the blades that improves the efficiency because of the recent development of technology in a field such as computational fluid dynamics.

Especially, it is known that secondary flow, which is a flow not being along a flow line, distorts a pressure distribution on the blades and results in loss of hydraulic efficiency.

SUMMARY OF THE INVENTION

Accordingly, an advantage of an aspect of the present invention is to provide a Francis turbine with an improved shape of blades that can reduce a circumferential velocity component generated in the flow downstream of the blades in a condition of a partial load operation, or reduce the secondary flow around the blades.

To achieve the above advantage, one aspect of the present invention is to provide a Francis turbine that comprises a crown which can rotate around a rotation axis, a plurality of blades circumferentially arranged on the crown, each of which including an inner end as a trailing edge and a band coaxially coupled with the crown by the blades, wherein a distance Rc can be defined as a distance between the rotation axis and an end by the crown side of the trailing edge, wherein a distance Rb can be defined as a distance between the rotation axis and an end by the band side of the trailing edge, wherein the distance Rc and the distance Rb satisfy $$0.2 \leq \frac{R_c}{R_b} \leq 0.4. \quad (a)$$

Further, another aspect of the present invention is to provide a Francis turbine runner that comprises a crown which can rotate around a rotation axis, a plurality of blades circumferentially arranged on the crown, each of which including an inner end as a trailing edge and a band coaxially coupled with the crown by the blades, wherein a projected profile of the trailing edge on a meridian plane, which is a plane including the rotation axis, is formed at an inner side of a straight line that connects both ends of the trailing edge on the meridian plane, wherein a distance Rb can be defined as a distance between the rotation axis and an end by the band side of the trailing edge, wherein the maximum distance s can be defined as a maximum distance between the straight line and the trailing edge on the meridian plane, wherein the distance Rb and the maximum distance s satisfy $$0 \leq \frac{s}{R_b} \leq 0.05. \quad (b)$$

Further features, aspects and advantages of the present invention will become apparent from the detailed description of preferred embodiments that follows, when considered together with the accompanying figures.

DETAILED DESCRIPTION OF THE PREFERRED EMBODIMENTS

A first embodiment in accordance with the present invention will be explained with reference to FIGS. 1 to 3.

Figure 1:
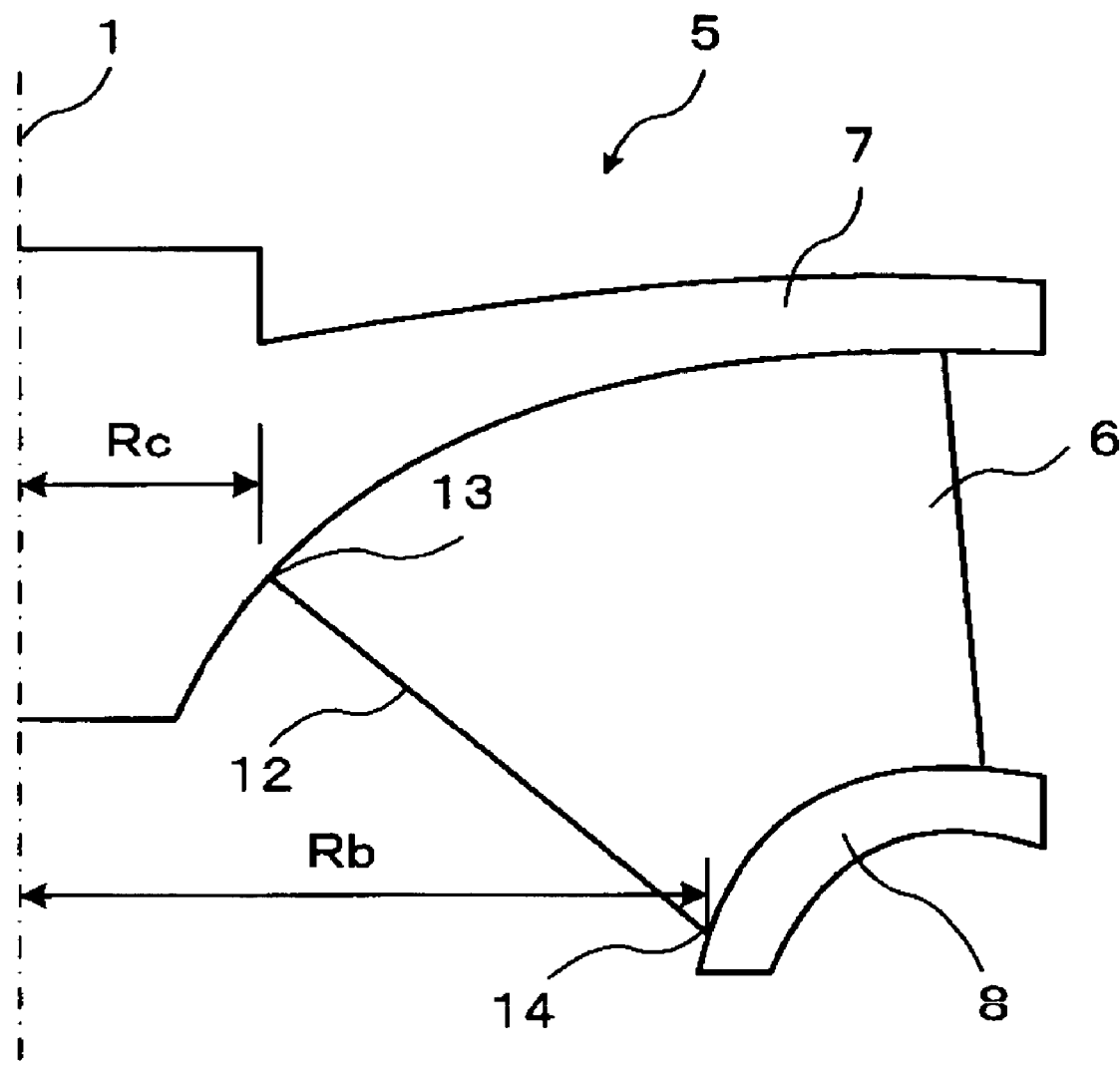
FIG. 1 is a half cross sectional view including a center axis of a Francis turbine runner according to the first embodiment of the invention.

FIG. 1 is a half cross sectional view including a center axis of a Francis turbine runner according to the first embodiment. Since the Francis turbine runner rotates around the center axis (also referred to as a rotation axis), half of the drawing is omitted as it has a symmetric profile in FIG. 1.

As shown in FIG. 1, a Francis turbine runner 5 includes a crown 7, a band 8, and a plurality of runner blades 6. Crown 7 is connected to a rotating shaft (not shown) at a rotation axis 1. Runner blades 6 are circumferentially arranged on the crown 7. In FIG. 1, one of runner blades 6 is shown as a projected profile on a meridian plane, which is a plane including the rotation axis 1. Band 8 is connected to runner blades 6 and is arranged so that the rotation axis 1 becomes in the center. Thus, band 8 is coaxially coupled with the crown 7 by the runner blades 6. In other words, runner blades 6 are circumferentially held around the rotation axis 1 between the crown 7 and the band 8.

With this configuration, the water flows along runner blades 6 from outside of the Francis turbine runner 5 to the inner side and drives Francis turbine runner 5 as a whole to one direction. The water flows out downwardly from the Francis turbine runner 5 after it drives Francis turbine runner 5.

An outer end of runner blade 6 is a leading edge, which is an inlet side of the blade 6 since the water comes from outside of the Francis turbine runner 5. In the same manner, an inner end of runner blade 6 is a trailing edge 12, which is an outlet side of the blade 6 where the water flows out toward a draft tube (not shown) connected to the Francis turbine.

On the trailing edge 12, an end that connects to the crown 7 is referred to as a crown side end 13. In the same manner, the other end of the trailing edge 12 that connects to the band 8 is referred to as a band side end 14. In this embodiment, a distance Rc, which is a distance between rotation axis 1 and the crown side end 13, and a distance Rb, which is a distance between rotation axis 1 and band side end 14, have a relationship described as following formula (a).

$$0.2 \leq \frac{R_c}{R_b} \leq 0.4 \quad \text{(a)}$$

In other words, a shape of the trailing edge 12 of the runner blades 6 are designed so that they satisfy the formula (a).

Conventionally, this value, which means a ratio of the distance Rc against the distance Rb, is approximately 50%. In this embodiment, the value Rc/Rb is reduced so that the flow from Francis turbine runner 5 has a smaller circumferential velocity component, especially in a partial load operation of the Francis turbine.

As mentioned above, water from the Francis turbine runner 5 flows toward the draft tube (not shown). The draft tube has a function to recover hydrostatic pressure from dynamic pressure of the water which flows out from the Francis turbine runner 5. The circumferential velocity component of the water flowed out from the Francis turbine runner 5 generates a rotating flow in the draft tube. It is desirable to not have the rotating flow in the draft tube because the rotating flow component is not likely to be recovered as hydrostatic pressure in the draft tube and it may result in hydraulic loss.

Generally, the shape of the runner blades 6 is optimized in a condition of a rated flow rate. In other words, runner blade 6 is designed so that the flow from the Francis turbine runner 5 has no circumferential velocity component when the Francis turbine is operated in the condition of the rated flow rate. When it is operated in a condition of a partial load operation, the flow rate of the water is reduced, though a rotating speed of the Francis turbine runner 5 is not changed. This causes a circumferential velocity component in the flow from the Francis turbine runner 5. And it results in a rotating flow component in the draft tube.

Figure 2:
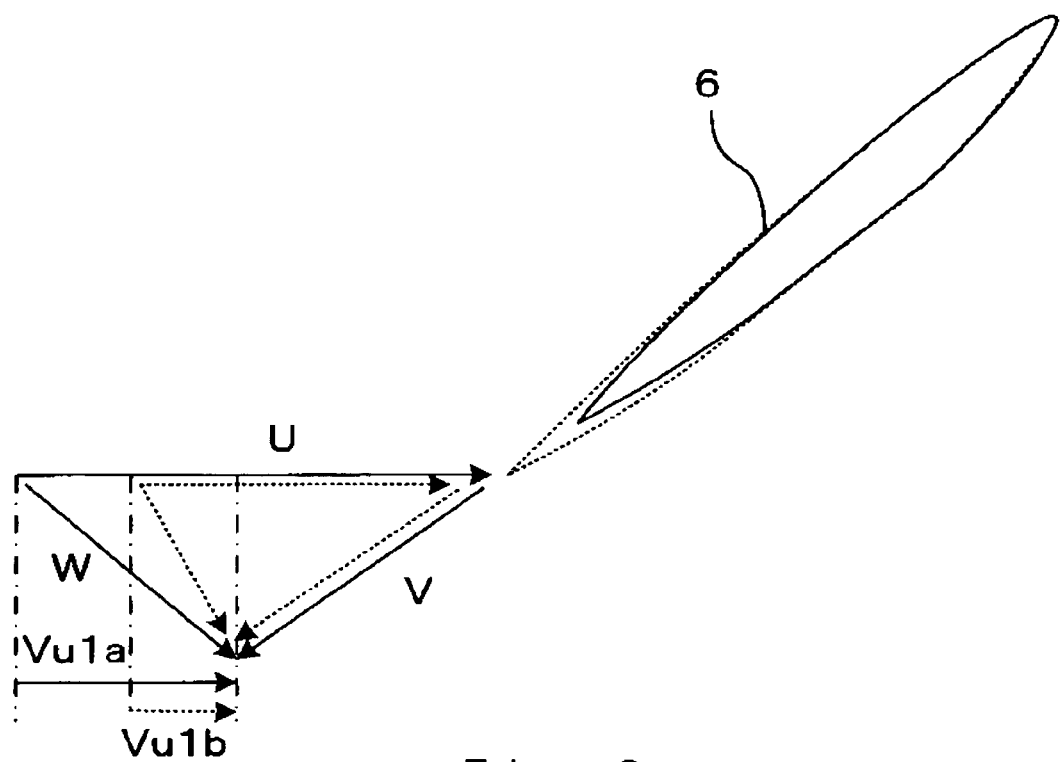
FIG. 2 is a schematic exploded sectional view of the runner blade 6 along a stream line of water with a velocity triangle of the flow from the runner blade according to the first embodiment.

FIG. 2 is a schematic exploded sectional view of the runner blade 6 along a stream line of water with a velocity triangle of the flow from the runner blade according to the embodiment in comparison with a conventional runner blade. A broken line denotes the runner blade according to the embodiment. A solid line denotes a conventional runner blade. In the velocity triangle shown in FIG. 2, U indicates rotation velocity, which is a velocity of the trailing edge by rotation, V indicates relative flow velocity of the water from the runner blade 6, and W indicates absolute velocity, which is a composition velocity of U and V.

In the partial load operation, the flow rate of the water is reduced. As shown in FIG. 2, the absolute velocity W has a circumferential velocity component Vu1a or Vu1b, because the relative flow velocity V is reduced by reduction of the flow rate. However, the length of the runner blade 6 according to the embodiment is longer than a conventional one since the shape of the runner blade 6 satisfies the formula (a) mentioned above. Therefore, a peripheral (tangential) velocity U, which is a velocity of the trailing edge 12 of runner blade 6 by rotation, becomes smaller compared to the conventional runner blade (shown in solid line). Thus the circumferential velocity component Vu1b, which is generated by the runner blade 6 according to the embodiment, may be smaller than the circumferential velocity component Vu1a generated from the conventional runner blade. Because the circumferential velocity component Vu1b is reduced, the hydraulic loss caused by the rotating flow component in the draft tube is also reduced.

Figure 3:
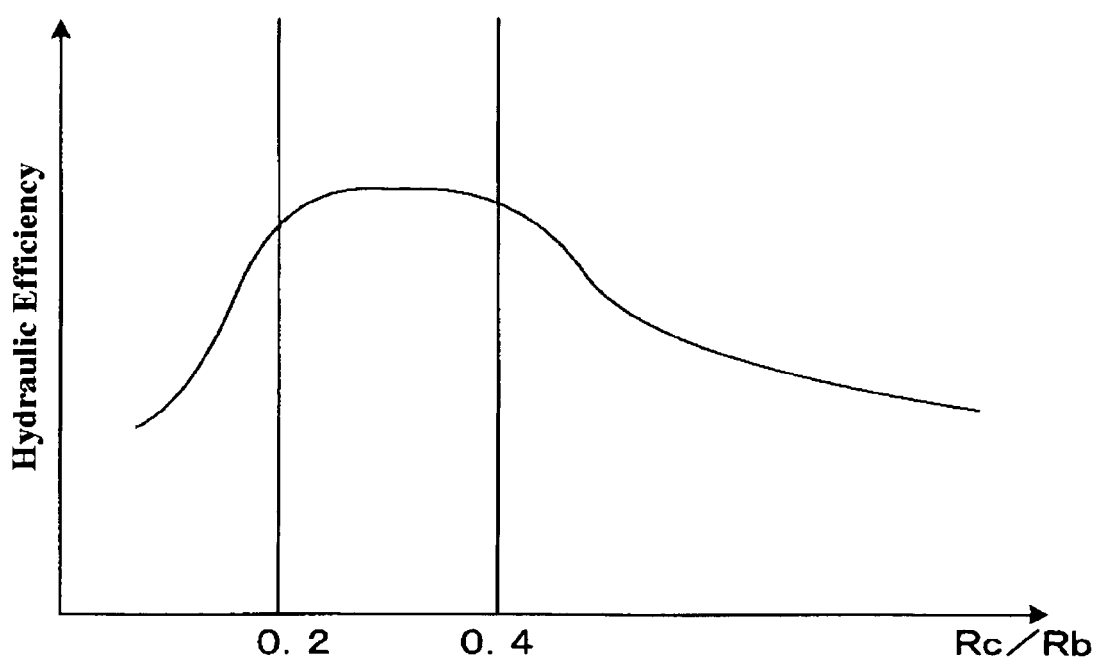
FIG. 3 is a hydraulic efficiency graph that shows hydraulic efficiency against the value Rc/Rb of the trailing edge in a condition of the partial load operation according to the first embodiment.

FIG. 3 is a hydraulic efficiency graph that shows hydraulic efficiency against the value Rc/Rb of the trailing edge in a condition of the partial load operation. The hydraulic efficiency shown in FIG. 3 is obtained by the flow analysis. As shown in FIG. 3, the hydraulic efficiency is improved in a range of the value Rc/Rb shown in the formula (a). This is because the embodiment reduces the rotating flow component and the rotating flow component occurred in the draft tube is not likely to be recovered as the hydrostatic pressure and likely to become loss. Therefore the circumferential velocity component of the flow, which generates a rotating flow component in the draft tube, is reduced, and the hydraulic efficiency is improved in the partial load operation.

On the other hand, when the value Rc/Rb is smaller, which means that distance Rc becomes smaller, frictional loss is increased since the length of the runner blade 6 is relatively elongated. Thus, the value Rc/Rb is preferably in the range determined by the formula (a).

According to the first embodiment in accordance with the invention, the value Rc/Rb, which is a ratio of the distance Rc from the rotation axis 1 to the crown end 13 against the distance Rb from the rotation axis 1 to the band end 14, is reduced. In other words, the position of the runner blade 6 at the outlet end is made to be relatively close to the rotation axis 1. Therefore the rotation velocity of the runner blade 6 is relatively reduced at the outlet (trailing edge 12). Accordingly, the circumferential velocity component is reduced at an inner side of the runner blade 6, and thus the loss in the draft tube due to increase of the rotating flow component is reduced and the turbine efficiency as a whole may be improved.

A second embodiment in accordance with the present invention will be explained with reference to FIGS. 4 to 6.

Figure 4:
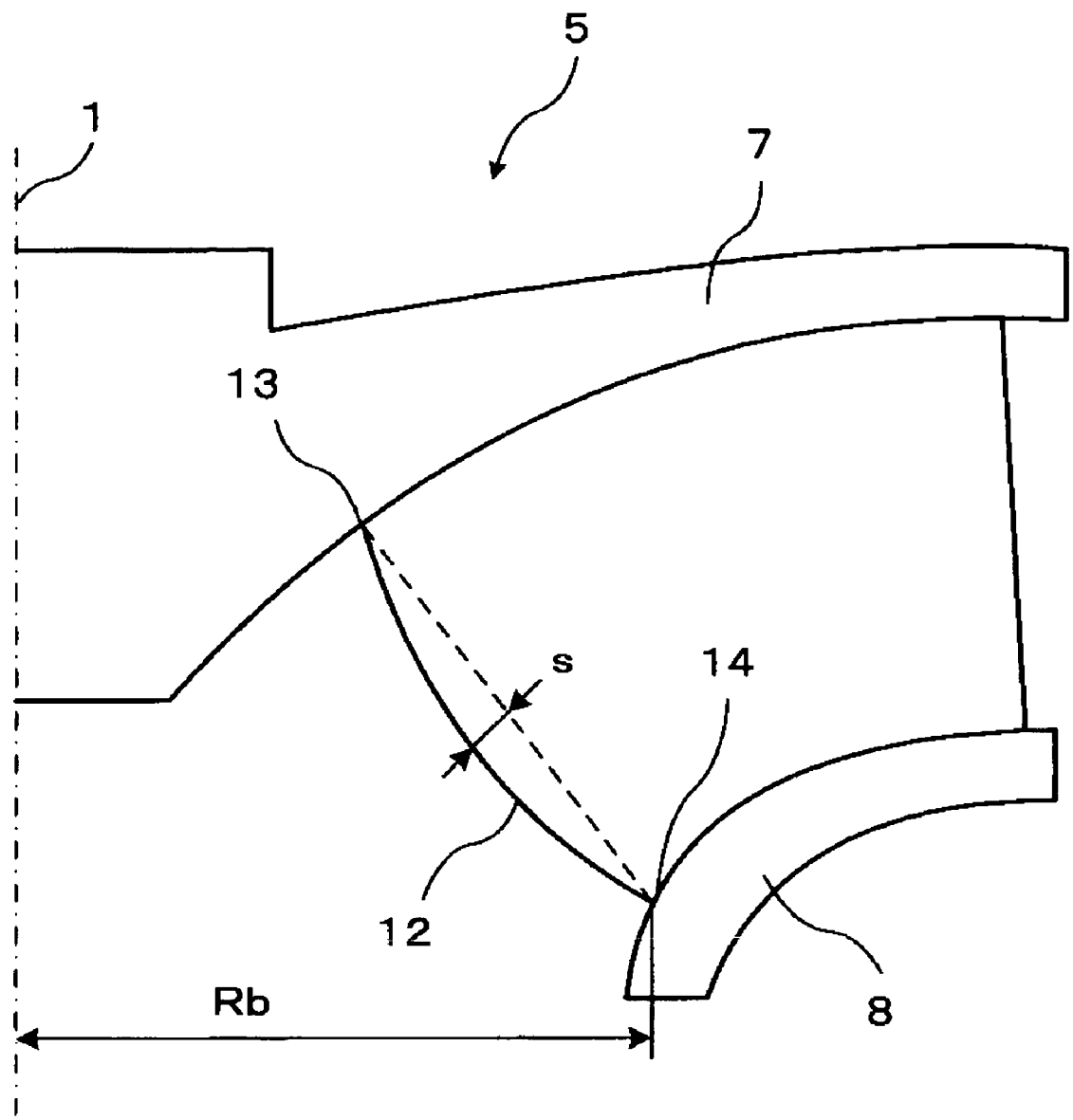
FIG. 4 is a half cross sectional view including a center axis of a Francis turbine runner according to the second embodiment of the invention.

FIG. 4 is a half cross sectional view including a center axis of a Francis turbine runner according to the second embodiment. Since the Francis turbine runner rotates around the center axis (also referred to as a rotation axis), half of the drawing is omitted as it has a symmetric profile in FIG. 4. The same symbols are used for the same elements shown in FIG. 1 and detailed description of those elements is omitted.

As shown in FIG. 4, a Francis turbine runner 5 includes a crown 7, a band 8, and a plurality of runner blades 6. Crown 7 is connected to a rotating shaft (not shown) at a rotation axis 1. Runner blades 6 are circumferentially arranged on the crown 7. Band 8 is connected to runner blades 6 and is arranged so that the rotation axis 1 becomes in the center. Thus, band 8 is coaxially coupled with the crown 7 by the runner blades 6. Same as FIG. 1, the runner blade 6 is shown as a projected profile on a meridian plane, which is a plane including the rotation axis 1 in FIG. 4. An outer end of runner blade 6 is a leading edge, which is an inlet side of the water. An inner end of runner blade 6 is a trailing edge 12, which is an outlet side of the water. On the trailing edge 12, an end that connects to the crown 7 is referred to as a crown side end 13. The other end of the trailing edge 12 that connects to the band 8 is referred to as a band side end 14. A distance Rb is defined as a distance between rotation axis 1 and band side end 14. A maximum distance s is defined on the meridian plane as a maximum distance between a straight line, which connects the crown side end 13 and the band side end, and the trailing edge 12.

In this embodiment, runner blades 6 are designed such that the trailing edge 12 of runner blade 6 is formed on the inner side of the straight line, which connects between the crown end 13 and the band end 14, on the meridian plane. Further, the runner blades 6 are designed so that the projected profile of the trailing edge 12 of the runner blades 6 on the meridian plane satisfies a following formula (b).

$$0 \le \frac{s}{R_b} \le 0.05 \quad (b)$$

The value s/Rb, which is a ratio of the maximum distance s against the distance Rb, is reduced so as to reduce the pressure distortion near the inlet of the runner blade 6. This helps to prevent the occurrence of the secondary flow due to the pressure distortion on the runner blade 6. In the conventional Francis turbine runner, the value s/Rb is approximately in a range of 0.1 to 0.3.

Figure 5A:
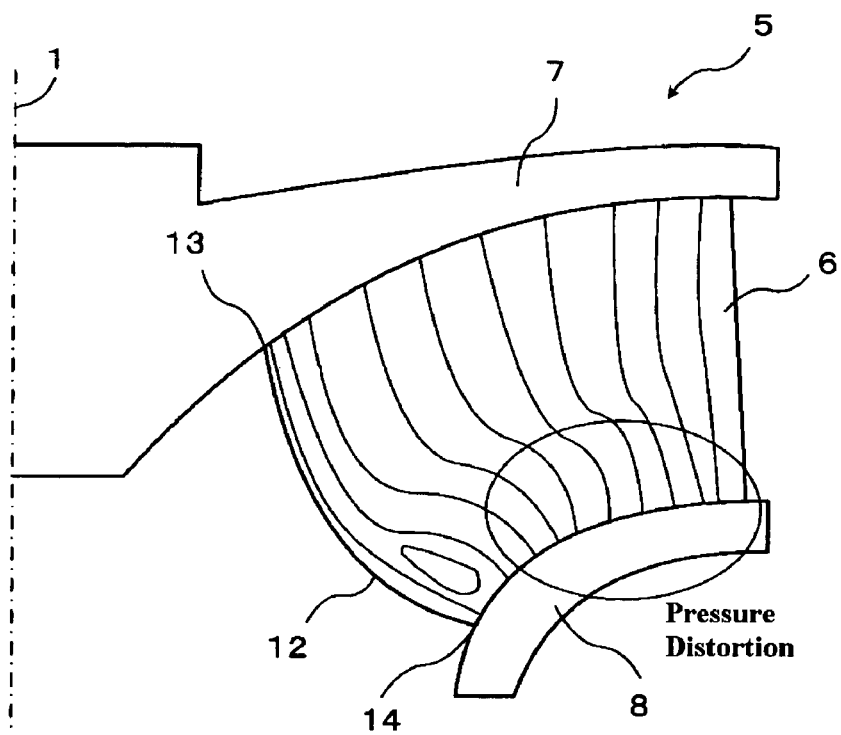
FIGS. 5A and 5B are pressure distribution diagrams on a suction surface of a runner blade of the Francis turbine obtained by the flow analysis.
Figure 5B:
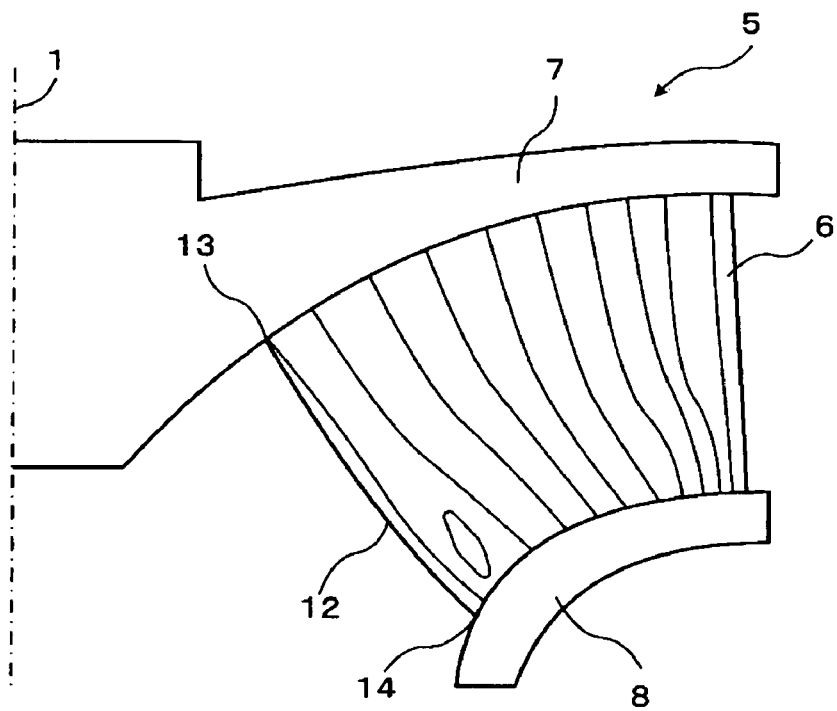

FIGS. 5A and 5B are pressure distribution diagrams on a suction surface of runner blade 6 obtained by the flow analysis. FIG. 5A shows a conventional Francis turbine runner, and FIG. 5B shows a Francis turbine runner 5 according to this embodiment. In FIGS. 5A and 5B, the same symbols are used to indicate the same element as shown in FIG. 4.

As shown in FIG. 5A, pressure distortion occurs near the inlet of the conventional runner blade 6 of the Francis turbine runner 5, wherein the ratio s/Rb is about 0.1 to 0.3. This pressure distortion generates a flow component along a pressure gradient on runner blade 6. The flow component may result in the secondary flow, which is a flow that is not along a stream line. The occurrence of the secondary flow causes the loss in Francis turbine runner 5, resulting in reduction in the turbine efficiency.

On the other hand, as shown in FIG. 5B, constant pressure lines on the suction surface of runner blade 6 are moved to the outlet side of the runner blade 6 relative to the conventional one. This is because the trailing edge 12 is formed as it is moved toward the outlet side of the runner blade 6 around the center portion of the trailing edge 12 compared to the conventional one. It is also shown in FIG. 5B that the pressure distortion is relatively reduced compared to the conventional one, which is shown in FIG. 5A.

Thus, according to this embodiment, the pressure distortion on the runner blade may be reduced. Therefore, the occurrence of the secondary flow may be prevented, and hydraulic efficiency may be improved.

Figure 6:
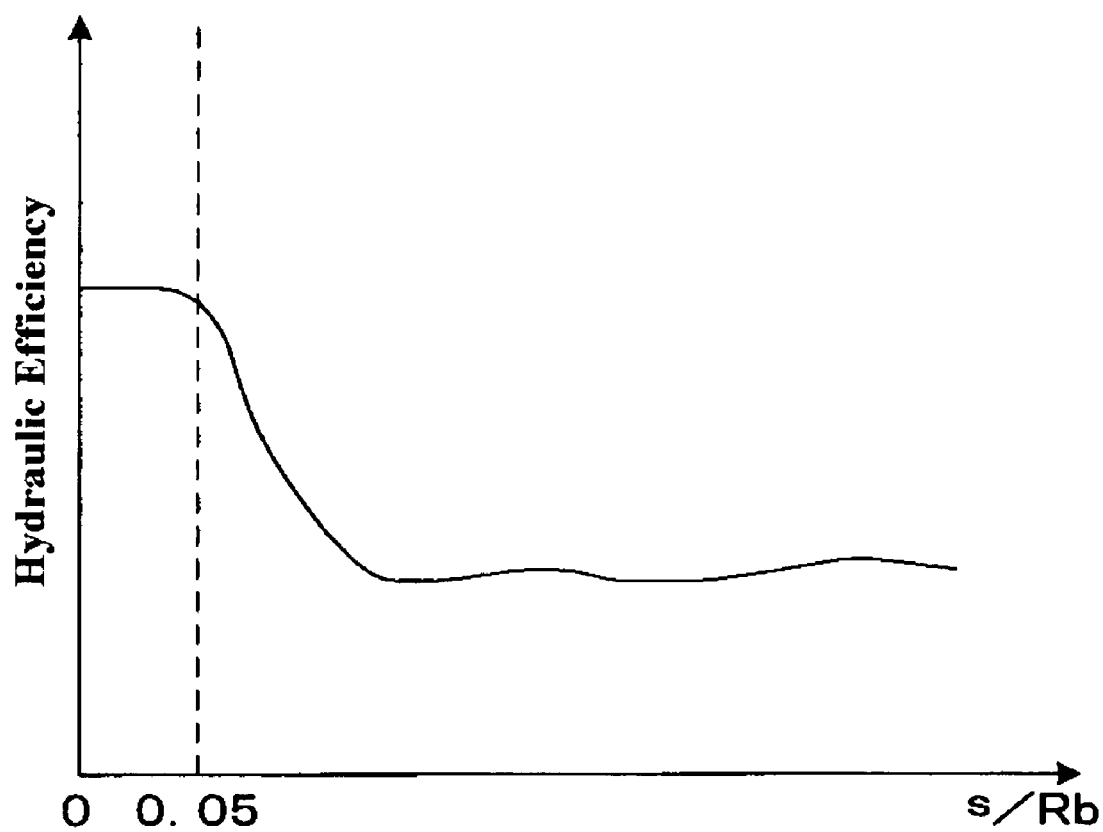
FIG. 6 is a hydraulic efficiency graph that shows hydraulic efficiency against the value s/Rb of the trailing edge obtained by the flow analysis.

FIG. 6 is a hydraulic efficiency graph that shows hydraulic efficiency against the value s/Rb of the trailing edge obtained by the flow analysis. It is shown that the hydraulic efficiency is improved in a range of the value s/Rb from around 0 to 0.05. Thus, the hydraulic efficiency of Francis turbine runner 5 may be improved when the trailing edge 12 of runner blade 6 is formed so as to satisfy the formula (b) mentioned above.

Other embodiments of the present invention will be apparent to those skilled in the art from consideration of the specification and practice of the invention disclosed herein. A profile of a leading edge, which is described in an application Ser. No. 10/867,203 entitled "Francis turbine" filed on Jun. 16, 2004, and/or a profile of a trailing edge, which is described in an application Ser. No. 10/867,207 entitled "Francis turbine" filed on Jun. 16, 2004 may be applied to the above mentioned embodiment for further improvement of performance.

What is claimed is:

1. A Francis turbine, comprising:
    a crown, which can rotate around a rotation axis;
    a plurality of blades circumferentially arranged on the crown, each of which including an inner end as a trailing edge; and
    a band coaxially coupled with the crown by the blades;
    wherein a projected profile of the trailing edge on a meridian plane, which is a plane including the rotation axis, is formed on an inner side of a straight line that connects both ends of the trailing edge on the meridian plane,
    wherein a distance Rb can be defined as a distance between the rotation axis and an end by the band side of the trailing edge,
    wherein the maximum distance s can be defined as a maximum distance between the straight line and the trailing edge on the meridian plane,
    wherein the distance Rb and the maximum distance s satisfy $$0 \le \frac{s}{R_b} \le 0.05.$$

2. A Francis turbine according to claim 1,
    wherein a distance Rc can be defined as a distance between the rotation axis and an end by the crown side of the trailing edge,
    wherein the distance Rc and the distance Rb satisfy $$0.2 \le \frac{R_c}{R_b} \le 0.4.$$

* * * * *